(12) United States Patent
Zheng et al.

(10) Patent No.: US 12,411,784 B2
(45) Date of Patent: Sep. 9, 2025

(54) SYSTEM AND METHOD FOR DIRECT MEMORY ACCESS

(71) Applicant: Infineon Technologies AG, Neubiberg (DE)

(72) Inventors: Yuanfen Zheng, Kirchheim (DE); Boris Alexander Niedetzky, Munich (DE); Henrik Hostalka, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 30 days.

(21) Appl. No.: 18/155,436

(22) Filed: Jan. 17, 2023

(65) Prior Publication Data
US 2023/0259469 A1 Aug. 17, 2023

(30) Foreign Application Priority Data
Feb. 16, 2022 (EP) .................................... 22157005

(51) Int. Cl.
*G06F 13/28* (2006.01)
*G06F 13/24* (2006.01)

(52) U.S. Cl.
CPC .............. *G06F 13/28* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 5,809,334 A | 9/1998 | Galdun et al. | |
| 8,359,415 B2 * | 1/2013 | Brown | G06F 9/45558 710/313 |
| 9,053,052 B1 * | 6/2015 | Schmidt | G06F 12/1081 |
| 9,727,501 B2 * | 8/2017 | Gowravaram | G06F 13/28 |
| 9,727,505 B2 * | 8/2017 | Conroy | G06F 13/1673 |
| 10,459,674 B2 * | 10/2019 | Whitby-Strevens | G06F 3/14 |
| 10,754,774 B2 * | 8/2020 | Choudhari | G06F 9/45558 |
| 10,872,049 B2 * | 12/2020 | Kessler | G06F 13/4282 |
| 10,977,198 B2 * | 4/2021 | Caraccio | G06F 3/064 |
| 11,042,496 B1 * | 6/2021 | BeSerra | G06F 13/4282 |
| 11,048,435 B2 * | 6/2021 | Kim | G06F 13/32 |
| 11,256,641 B2 * | 2/2022 | Chandhoke | G06F 13/368 |
| 11,409,685 B1 * | 8/2022 | Kaplan | H04L 67/1095 |
| 2013/0321673 A1 * | 12/2013 | Lim | H04N 17/002 348/241 |
| 2013/0322746 A1 * | 12/2013 | Cote | G06T 3/4015 382/163 |

(Continued)

FOREIGN PATENT DOCUMENTS

JP 2000134242 A 5/2000
WO 2018126274 A2 7/2018

*Primary Examiner* — Henry Tsai
*Assistant Examiner* — Christopher A Bartels
(74) *Attorney, Agent, or Firm* — Slater Matsil, LLP (57) ABSTRACT

In accordance with an embodiment, a direct memory access (DMA) system includes input interface circuitry configured to receive a data packet of a sensor from a source memory. The DMA system comprises processing circuitry configured to determine whether the data packet comprises a synchronized data frame and, when it is determined that the data packet comprises a synchronized data frame, extract a payload of the synchronized data frame. The DMA system comprises output interface circuitry configured to send the payload or data derived from the payload to a destination memory.

22 Claims, 8 Drawing Sheets

(56) References Cited

U.S. PATENT DOCUMENTS

| | | | |
|---|---|---|---|
| 2013/0322753 A1* | 12/2013 | Lim | G06T 5/73 |
| | | | 382/167 |
| 2015/0296193 A1* | 10/2015 | Cote | H04N 25/611 |
| | | | 382/167 |
| 2015/0331818 A1 | 11/2015 | Klein et al. | |
| 2016/0210252 A1* | 7/2016 | Kawakami | G06F 13/16 |
| 2017/0363711 A1* | 12/2017 | Rao | G01S 7/023 |
| 2019/0041842 A1* | 2/2019 | Cella | G06N 3/02 |
| 2019/0251048 A1* | 8/2019 | Kavand | G06F 9/5044 |
| 2020/0042379 A1 | 2/2020 | Miyata | |
| 2020/0081858 A1* | 3/2020 | Philmore | G06F 13/4027 |
| 2021/0117246 A1* | 4/2021 | Lal | G06T 1/20 |
| 2021/0117353 A1 | 4/2021 | Kasichainula | |
| 2021/0349922 A1* | 11/2021 | Hsu | G06F 16/29 |
| 2023/0231811 A1* | 7/2023 | Dalal | G06F 13/1605 |
| | | | 710/308 |
| 2024/0125759 A1* | 4/2024 | Anderson, Jr. | G06N 20/00 |
| 2025/0005266 A1* | 1/2025 | Bax | G06F 16/35 |

\* cited by examiner

SYSTEM AND METHOD FOR DIRECT MEMORY ACCESS

This application claims the benefit of European Patent Application No. 22157005, filed on Feb. 16, 2022, which application is hereby incorporated herein by reference.

TECHNICAL FIELD

The present disclosure relates to direct memory access (DMA). Examples relate to a DMA system, a system for processing sensor data, and a method for DMA.

BACKGROUND

When a sensor transfers sensor data to a computing system such as a microcontroller unit (MCU), the computing system configures a DMA engine to move the entire sensor data from a receive buffer to an internal memory of the computing system. For further processing of the sensor data, the computing system needs to validate the sensor data and extract the payload from the sensor data. This may cause a high baseload on the computing system. Hence, there may be a demand for DMA with improved sensor data processing.

SUMMARY

According to a first aspect, the present disclosure relates to a DMA system, comprising input interface circuitry configured to receive a data packet of a sensor from a source memory. The DMA system comprises processing circuitry configured to determine whether the data packet comprises a synchronized data frame and, if it is determined that the data packet comprises a synchronized data frame, extract a payload of the synchronized data frame. The DMA system comprises output interface circuitry configured to send the payload or data derived from the payload to a destination memory.

According to a second aspect, the present disclosure relates to a system for processing sensor data. The system comprises a DMA system as described herein, the source memory, the destination memory and further processing circuitry external to the DMA system. The further processing circuitry is coupled to the destination memory and configured to read the payload or the data derived from the payload from the destination memory and process the payload or the data derived from the payload.

According to a third aspect, the present disclosure relates to a method for DMA. The method comprises receiving a data packet of a sensor from a source memory, determining whether the data packet comprises a synchronized data frame, and, if it is determined that the data packet comprises a synchronized data frame, extracting a payload of the synchronized data frame. The method further comprises sending the payload or data derived from the payload to a destination memory.

BRIEF DESCRIPTION OF THE DRAWINGS

Some examples of apparatuses and/or methods will be described in the following by way of example only, and with reference to the accompanying figures, in which.

DETAILED DESCRIPTION OF ILLUSTRATIVE EMBODIMENTS

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
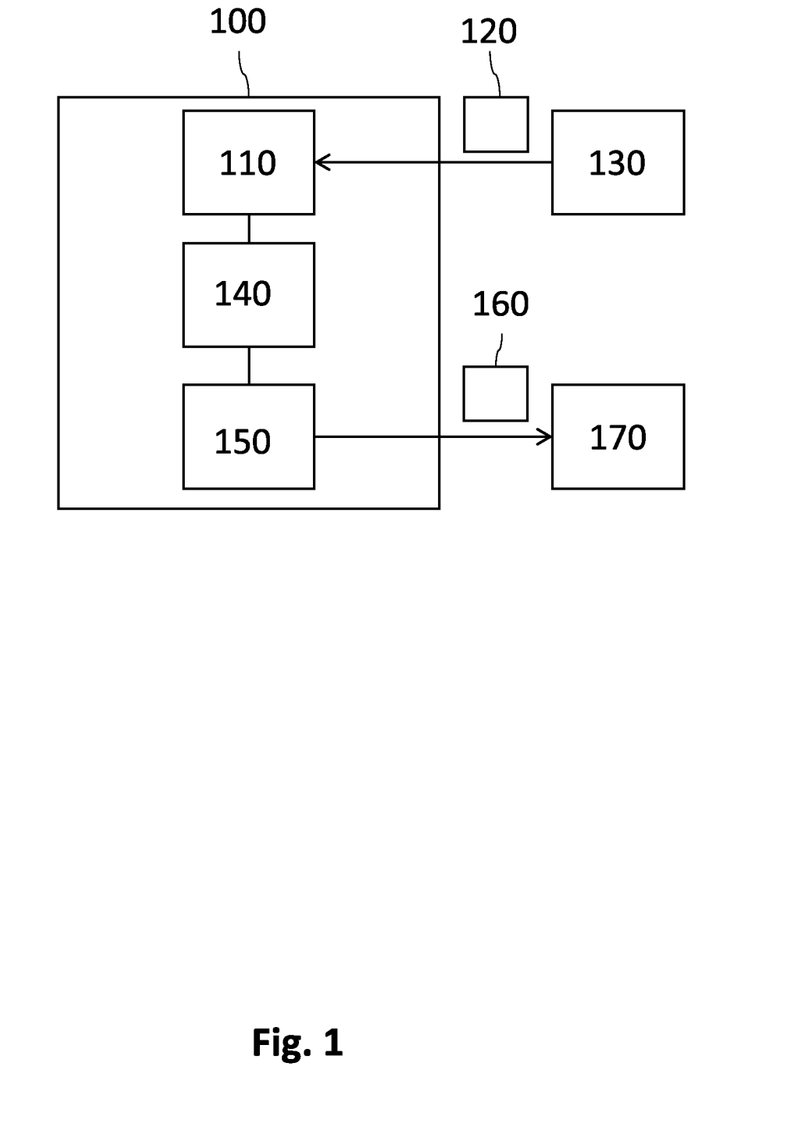
FIG. 1 illustrates a block diagram of an example of a DMA system.

FIG. 1 illustrates a block diagram of an example of a DMA system 100. DMA refers to a type of memory access used for computing systems, such as, MCUs, handheld devices, appliances, laptop computers, desktop computers, mainframes, distributed computer systems, datacenters, cloud server, or wearables. DMA may be characterized as direct insofar as it may allow data transfer independently of further processing circuitry, e.g., a super-ordinated processing circuitry with regard to the DMA system 100. In other words: DMA may allow data transfers on behalf of the further processing circuitry. The DMA system 100 may transfer data, e.g., from a peripheral device to a main system memory of a computing system.

The DMA system 100 and the further processing circuitry may, e.g., be part of one and the same computing system (e.g., third-party DMA) or be integrated into separated computing systems transferring data with each other via DMA (e.g., bus mastering). The DMA system 100 may, e.g., be integrated into a semiconductor die peripheral to the further processing circuitry. The DMA system 100 may include software and hardware configured to generate memory addresses and perform memory read or write cycles. It may include hardware registers, such as an address register, a control register, a status register, and a byte count register.

The DMA system 100 comprises input interface circuitry 110 configured to receive a data packet 120 of a sensor from a source memory 130. The sensor may be any device for sensing any physical, chemical, or biological quantity, e.g., an inductive, optical, or magnetic sensor. The sensor may convert acquired measurands into measurement data and request a data transfer to the source memory 130. The source memory 130 may be a data buffer of an I/O interface (sensor interface) between a computing system comprising the DMA system 100 and the sensor.

The data packet 120 may be a portion of data generated by the sensor, e.g., based on data acquisition. The data packet 120 may refer to, e.g., a self-contained data unit with a well-defined length or a data stream with an initially unknown length. The data packet 120 may comprise payload and overhead (overhead bits). While payload may indicate the actual intended information, e.g., measurement data of the sensor, overhead may be additional data, e.g., useful for transmission or classification of the data packet 120. The overhead may comprise metadata, a destination address, a source address, a header, a footer, error detection code, a protocol identifier, a packet length, status data, or alike. The data packet 120 may be a sequence of data frames arranged in a certain order, e.g., chronologically. The payload may be fragmented into the data frames, which in turn are encapsulated into the data packet 120. An example of a structure (format) of a data packet is explained with reference to FIG. 4.

The data packet 120 and the data frame may refer to bundles of data in different abstraction layers of a communication protocol. On a physical layer of the communication protocol, the reception of the data packet 120 may correspond to a transmission of bits, bytes, or of any other units of digital information over a physical medium. For instance, the physical layer may perform the transmission of the digital information by converting it into signals, such as electrical, radio, or optical signals, and mediating them via the physical medium.

The input interface circuitry 110 may receive the data packet 120 using any software and hardware components, e.g., wire, optical fiber, etc. For instance, the input interface circuitry 110 may receive the data packet 120 via a DMA channel. When receiving the data packet 120, the input interface circuitry 110 may read the data packet 120 from the source memory 130 and write it into a temporary data register internal to the DMA system 100. The DMA system 100 may, e.g., be capable of performing dual-cycle data transfers (fetch-and-deposit transfers). The DMA system 100 may receive (and send) the data packet 120 based on any DMA transfer mode, e.g., single, block, or demand mode. The DMA system 100 may have a certain configuration which defines, e.g., the DMA transfer mode, a communication protocol used for the data transfer, or a network address of the source memory 130.

The DMA system 100 further comprises processing circuitry 140 communicatively coupled to the input interface circuitry 110 and to an output interface circuitry 150. The processing circuitry 140 is configured to determine whether the data packet 120 comprises a synchronized data frame.

The processing circuitry 140 may be any electronic circuit for processing the data packet 120. The processing circuitry 140 is to be distinguished from a further processing circuitry, e.g., a central processing circuitry (CPU) of the computing system (e.g., an MCU), for which the DMA system 100 performs a memory transfer of the data packet 120.

The processing circuitry 140 may determine whether the data packet 120 comprises a synchronized data frame based on any synchronization method (or synchronization scheme), e.g., time gap synchronization, start and end flag synchronization, or packet length indication. The synchronization method may allow the processing circuitry 140 to detect a frame border of a data frame in the data packet 120. The synchronization method may be defined by a communication protocol jointly used by the receiving input interface circuitry 110 and a sender of the data packet 120 (e.g., an I/O interface to the sensor). In some examples, the processing circuitry 140 is configured to detect synchronization data in the data packet 120 and determine whether the data packet 120 comprises a synchronized data frame based on the synchronization data. The synchronization data (synchronization signal, frame alignment signal) may be, e.g., a distinctive bit, byte or sync word in an overhead of the data packet 120. The synchronization data may indicate a beginning and/or end of a data frame in the data packet 120. For instance, if the processing circuitry 140 detects synchronization data indicating a beginning of a data frame (e.g., start flag), then, the following data elements of the data packet 120 may be deemed as a synchronized data frame. The number of the following data elements counted as the synchronized data frame may be defined by the communication protocol, information given by a header of the synchronized data frame or correspond to all data elements between detected frame borders. The processing circuitry 140 may store a header of the synchronized data frame in a status register of the DMA system or at a defined memory address of a destination memory.

The processing circuitry 140 is further configured to, if it is determined that the data packet comprises a synchronized data frame, extract a payload 160 of the synchronized data frame. The DMA system 100 further comprises output interface circuitry 150 configured to send the payload 160 or data derived from the payload 160 to a destination memory 170. The destination memory 170 may be any data storage device for retaining data. The destination memory 170 may be internal memory (main memory) of a further processing circuitry for which the DMA system 100 operates data transfers. The destination memory 170 may in alternative examples be external to the DMA system 100.

The payload 160 may comprise raw data recorded by the sensor or preprocessed data from the sensor. Depending on the communication protocol used, the processing circuitry 140 may extract the payload 160 of the synchronized data frame based on a frame length of the synchronized data frame. The frame length may be, e.g., predefined or determined by the processing circuitry 140 based on at least one of the synchronization data (e.g., indicating a start and end flag of a data frame) and a header of the synchronized data (e.g., the header may comprise frame information data indicating the frame length).

The payload 160 may be considered aligned sensor data since the processing circuitry 140 checks for synchronization before extracting the payload 160. The DMA system 100 may, therefore, offload a processor (a further processing circuitry) external to the DMA system 100 from initial validation and preprocessing of sensor data.

Extraction of the payload 160 may refer to a retrieval, import, or collection of the payload 160 by intermediately storing it in the DMA system 100, e.g., for further data processing or migration. For instance, the DMA system 100 may store the payload 160 in an internal data buffer temporarily. The extraction of the payload 160 may, in some examples, include imposing a data structure on the payload 160 (which may initially be unstructured or poorly structured), (re-)formatting the payload 160 or performing data transformation of the payload 160. In some examples, the processing circuitry 140 is configured to change a data structure of the payload 160, e.g., reorder or rearrange individual data elements of the payload 160. The output interface circuitry 150 may be configured to send the payload 160 with the changed data structure to the destination memory 170. For example, the processing circuitry 140 may change the data structure of the payload 160 by assigning a respective destination address to data elements (e.g., bits or bytes) of the payload 160, i.e., indexing the data elements, based on a certain assignment pattern. The assignment pattern may correspond to predefined requirements matching an application of the DMA system 100.

For instance, the processing circuitry 140 may be configured to change the data structure of the payload 160 based on a matrix transposition (a detailed example is described below with reference to FIG. 5a) or a bit-reversal permutation (a detailed example is described below with reference to FIG. 5b). For a matrix transposition, the processing circuitry 140 may transpose data elements of the payload 160 representing a matrix, yielding a diagonally flipped representation of the matrix. For a bit-reversal permutation, the processing circuitry 140 may reverse an original indexing of the data elements of the payload 160. In some examples, the processing circuitry 140 may be configured to change the data structure of the payload 160 into a circular buffer structure (a detailed example is described below with reference to FIG. 5c). The processing circuitry 140 may increment an index of data elements of the payload 160 such that—after a fixed number of data elements—the "oldest" data element is over-written and is used as new starting point for incrementation of the index, i.e., an end-to-end connected, fixed-size buffer is emulated.

In some examples of the present disclosure, the processing circuitry 140 is further configured to determine whether the data packet 120 comprises invalid data and, if it is determined that the data packet 120 comprises invalid data, discard the invalid data. In other words, the DMA system 100 may disregard, delete or overwrite the invalid data stored in its internal memory and may solely send the payload 160, data derived thereof, or other data deemed as valid to the destination memory 170. The DMA system 100 may, thus, comprise logic for deciding whether the data packet 120 comprises invalid data and determining which parts of the data packet 120 are invalid data. The processing circuitry 140 may rate overhead or misaligned data of the data packet 120 as invalid. For instance, the processing circuitry 140 may be configured to determine whether the data packet 120 comprises invalid data by determining whether the data packet 120 comprises data between the synchronized data frame and a second synchronized data frame. The second synchronized data frame may be a data frame of the data packet 120 following the synchronized data frame. If it is determined that the data packet 120 comprises data between the synchronized data frame and the second synchronized data frame, the processing circuitry 140 may discard the data between the synchronized data frame and the second synchronized data, i.e., rate the data, e.g., including overhead or a misaligned data frame, as invalid.

In some examples, the processing circuitry 140 is configured to determine whether the data packet 120 comprises invalid data by determining whether the data packet 120 comprises data preceding the synchronized data frame and, if it is determined that the data packet 120 comprises data preceding the synchronized data frame, discard the data preceding the synchronized data frame. In case, the data packet 120 comprises several synchronized data frames, the synchronized data frame may be first with respect to an order of the data packet 120. In other words: parts of the data packet 120 which are between a start of the data packet 120 and a first synchronized data frame, i.e., data from start of the data packet 120 until first synchronized data frame is detected, may be rejected.

Depending on the structure of the data packet 120, the data packet 120 may include further relevant information in its overhead such as status data indicating a status of the sensor, sensor configuration data indicating a configuration of the sensor, DMA configuration data indicating a desired configuration of the DMA system 100, or information data indicating an action to be triggered. This relevant information may be processed by the DMA system 100 for offloading a further processing circuitry external to the DMA system 100. In some examples, the data packet 120 may include at least one flag for triggering an action of the DMA system 100 or the further processing circuitry. For instance, if the sensor is a radar sensor for object detection, the data packet 120 may include a detection bit, e.g., in its header, wherein the detection bit may be set during preprocessing by the sensor if an object is detected. The DMA system 100 may extract the flag and execute the associated action or transfer the flag to the further processing circuitry.

For example, the data packet 120 may comprise sensor configuration data in a header of the synchronized data frame. The processing circuitry 140 may be further configured to extract the sensor configuration data from the header of the synchronized data frame. The output interface circuitry 150 may be configured to send the sensor configuration data to the destination memory 170. The output interface circuitry 150 may write the sensor configuration data into a defined memory area of the destination memory 170.

In some examples, the data packet 120 may comprise DMA configuration data indicating a desired configuration of the DMA system 100. The processing circuitry 140 may be configured to configure the DMA system 100 based on the DMA configuration data. For instance, the processing circuitry 140 may change a transfer mode or priority of the DMA system 100 as indicated in the DMA configuration data. If the data packet 120 comprises information data in a header of the synchronized data frame, the processing circuitry 140 may be configured to detect the information data and process the information data, e.g., to trigger an action of the DMA system 100.

If the data packet 120 comprises status data indicating a status of the sensor, the processing circuitry 140 may be configured to determine whether the data packet 120 comprises invalid data by determining whether the data packet 120 comprises data between the status data and the synchronized data frame. If it is determined that the data packet 120 comprises data between the status data and the synchronized data frame, the processing circuitry 140 may be configured to discard the data between the status data and the synchronized data frame. Alternatively or additionally, the processing circuitry 140 may be configured to determine whether the data packet 120 comprises invalid data by determining whether the status data indicate an error of the sensor. If it is determined that the status data indicates an error of the sensor, the processing circuitry 140 may be configured to discard data of the data packet 120 following (e.g., directly subsequent to) the status data. The status data may additionally be stored in a status register of the DMA system 100 in parallel.

In cases that the processing circuitry 140 is configured to determine whether the status data indicate an error of the sensor, the output interface circuitry 150 may be further configured to, if it is determined that the status data indicates an error of the sensor, send an interrupt command to the further processing circuitry external to the DMA system 100. An interrupt command may be a request for the further processing circuitry to interrupt currently executing code for processing the error of the sensor in a timely manner. If the request is accepted, the further processing circuitry may suspend its current activities and execute an interrupt handler or interrupt service routine to deal with the error of the sensor. Alternatively or additionally, the processing circuitry 140 may be configured to process the error of the sensor, e.g., by stopping the current data transfer (DMA transaction), reconfiguring the DMA system 100 and/or starting a new data transfer.

In summary, data of the data packet 120 may be counted as invalid and may be dropped by the DMA system 100 in the following cases:
- if data is received after detection of a sensor error;
- if data is received after detection of a sensor error and before next synchronization data;
- if data is received after status data (command phase of the data packet 120) and before synchronization data; and/or
- if data is received after the synchronized data frame (e.g., after valid frame length) and before a subsequent synchronized data frame (e.g., before next synchronization data).

The DMA system 100 may be considered a "magnified DMA system" which may perform common DMA tasks, such as transfer of sensor data from a source memory 130 to a destination memory 170, and, e.g., in parallel, may synchronize data frames of the sensor data, discard misaligned data (invalid data), extract payload 160 from aligned data (synchronized data frame), and/or reorganize a data structure of the payload 160 without an involvement of an associated processor external to the DMA system 100 (further processing circuitry). Unlike a conventional DMA system which basically moves a received data packet to the destination memory without further processing of the data packer, DMA system 100 may additionally offload the processor by taking on further tasks such as sensor status detection, frame synchronization and data discard, e.g., in case of an error. These further tasks may conventionally be executed by the processor in a software routine causing a baseload on the processor. Thus, the DMA system 100 may eliminate this baseload by deploying enhanced and specialized DMA functions.

The DMA system 100 may increase a maximum data transfer speed in a computing system combining the DMA system 100 and a processor, thus, the DMA system 100 may be useful for highspeed data acquisition. The DMA system 100 may decrease latency in servicing a data acquisition device since the dedicated hardware of the DMA system 100 responds more quickly compared to an interrupt, and a time interval for transferring the data is shorter. Besides, the DMA system 100 may reduce an amount of temporary storage (source memory) required for an I/O device.

Figure 2:
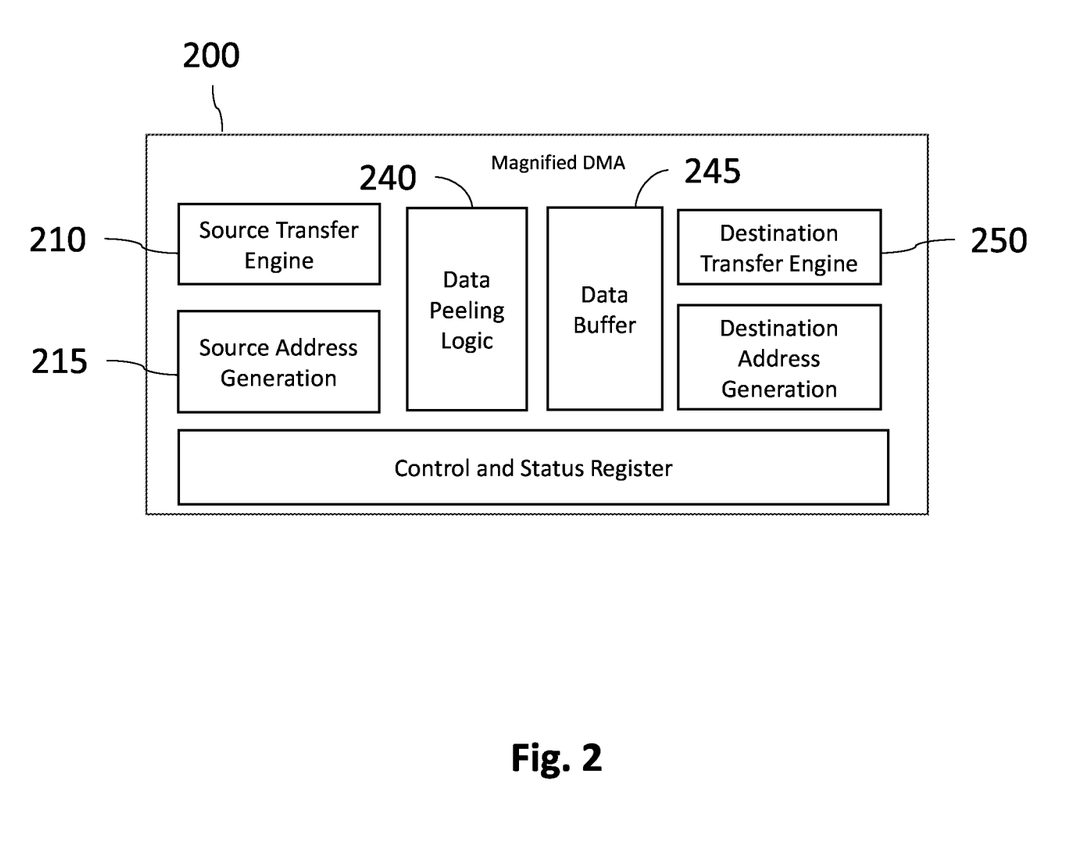
FIG. 2 illustrates a block diagram of another example of a DMA system.

FIG. 2 illustrates a block diagram of another example of a DMA system 200. The DMA system 200 comprises input interface circuitry 210 (source transfer engine) configured to receive a data packet of a sensor from a source memory. The DMA system 200 may be integrated into a computing system and perform data transfers on behalf of an MCU of the computing system. The input interface circuitry 210 may receive the data packet via a serial communication bus from a serial peripheral interface (SPI) to the sensor.

The DMA system 200 further comprises a source address generator 215. The source address generator 215 is a software tool for determining a source address of the source memory from which the input interface circuitry 210 (source transfer engine) may fetch the data packet. The source address may be a reference to a specific memory location in the source memory.

The DMA system 200 further comprises processing circuitry 240 (data peeling logic) configured to determine whether the data packet comprises a synchronized data frame. The processing circuitry 240 is further configured to, if it is determined that the data packet comprises a synchronized data frame, extract a payload of the synchronized data frame. In other words, the processing circuitry 240 may execute data peeling on the fetched data packet and extract meaningful sensor data (payload). For instance, the processing circuitry 240 may detect a command phase, data phase, and synchronization data of the data packet and pull out valid sensor data. The processing circuitry 240 may check a sensor status of the sensor based on the command phase. If an error is detected in the sensor status, the processing circuitry 240 may issue an interrupt command to the MCU.

The processing circuitry 240 may process the fetched data packet framewise. In each frame, the processing circuitry 240 may determine whether synchronization data (e.g., a start flag) is present. If it is determined that synchronization data is present, the processing circuitry 240 may deem following data, e.g., within a predefined frame length, as valid. The processing circuitry 240 may store the payload of the valid data in an internal data buffer 245 temporarily. The processing circuitry 240 may further process the payload, yielding data derived from the payload.

The DMA system 200 further comprises output interface circuitry 250 (destination transfer engine) configured to send the payload or data derived from the payload to a destination memory.

The DMA system 200 may combine common DMA tasks with a synchronization of data frames of the sensor data, a discard of misaligned data, and extraction of payload from aligned data, and/or a reorganization of a data structure of the payload without an involvement of an associated processor external to the DMA system 200 (further processing circuitry). The DMA system 200 may increase a maximum data transfer speed in a computing system combining the DMA system 200 and the processor, thus, the DMA system 200 may be useful for highspeed data acquisition. The DMA system 200 may decrease latency in servicing a data acquisition device since the dedicated hardware of the DMA system 200 responds more quickly compared to an interrupt, and a time interval for transferring the data is shorter. Besides, the DMA system 200 may reduce an amount of temporary storage (source memory) required for an I/O device.

Figure 3:
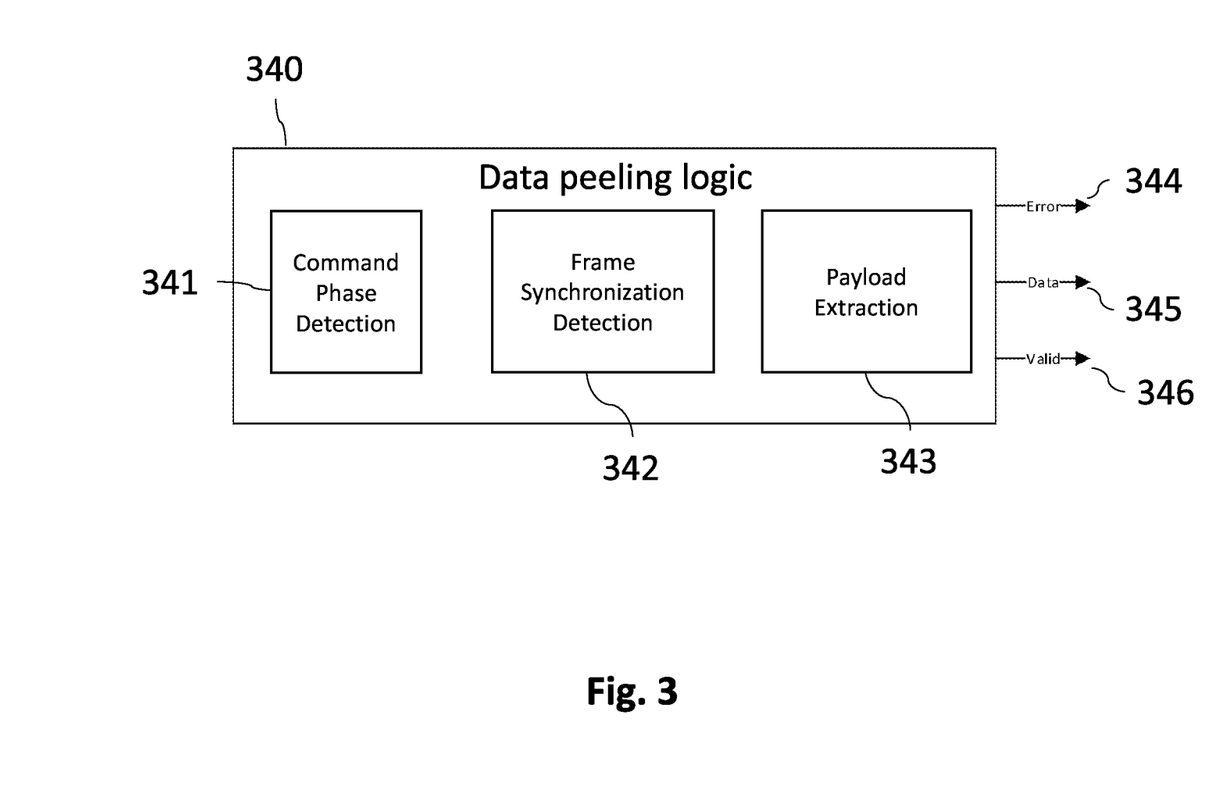
FIG. 3 illustrates a block diagram of an example of a processing circuitry of an example of a DMA system.

FIG. 3 illustrates a block diagram of an example of a processing circuitry 340 of a DMA system according to examples described herein, such as DMA system 100 or 200.

The processing circuitry 340 is configured to determine whether a data packet received by the DMA system comprises a synchronized data frame. The processing circuitry 340 is further configured to, if it is determined that the data packet comprises a synchronized data frame, extract a payload of the synchronized data frame.

The processing circuitry 340 comprises hardware and/or software to execute a first function 341 (command phase detection). The first function 341 may allow the processing circuitry 340 to distinguish between a command phase and a data phase of the data packet. The command phase may comprise status data indicating a status of a sensor (from which the data packet originated). The processing circuitry 340 further comprises hardware and/or software to execute a second function 342 (frame synchronization detection). The second function 342 may allow the processing circuitry 340 to detect synchronization data used for framing of the data packet, i.e., for determining whether the data packet comprises a synchronized data frame. The processing circuitry 340 comprises hardware and/or software to execute a third function 343 (payload extraction). The third function 343 may allow the processing circuitry 340 to extract the payload of a synchronized data frame.

The processing circuitry 340 comprises three output channels 344, 345, and 346. The processing circuitry 340 may output the status of the sensor via the first channel 344. The processing circuitry 340 may output the data packet via the second channel 345 and output an indication of validity of the data packet via the third channel 346.

Figure 4:
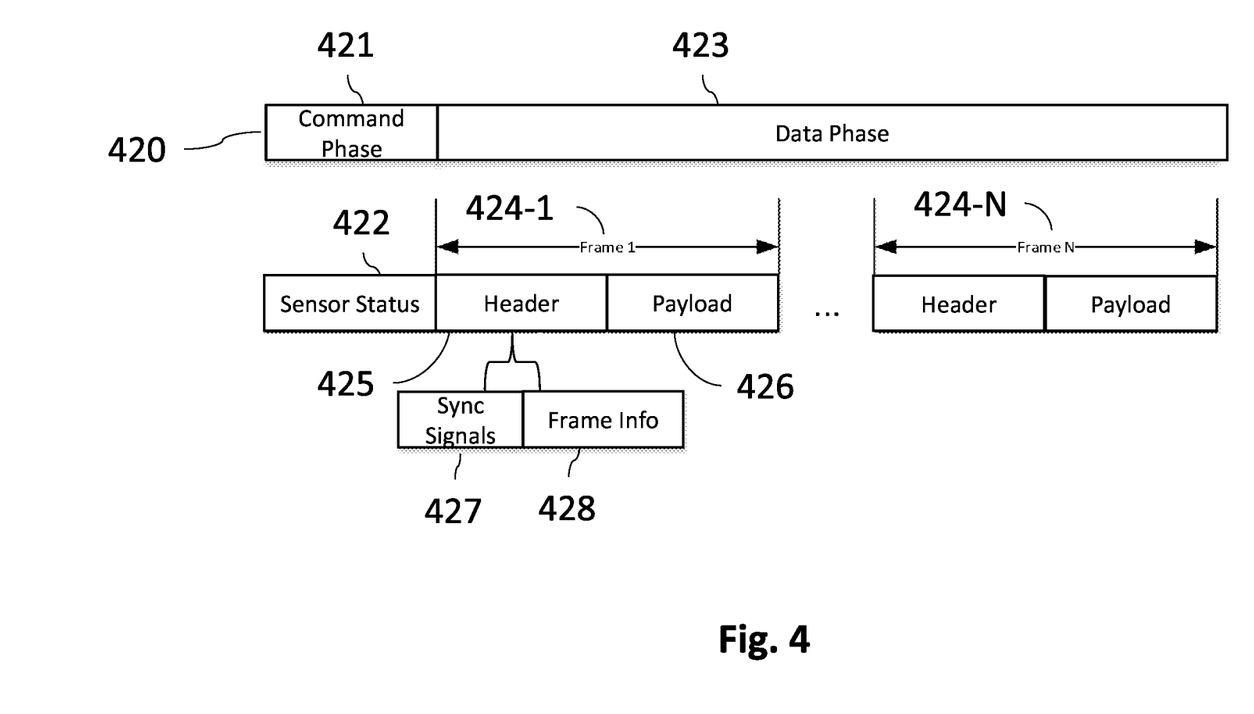
FIG. 4 illustrates a structure of an example of a data packet.

FIG. 4 illustrates a structure of an example of a data packet 420. For instance, a sensor may generate sensor data and transfer it to a computing system via an I/O interface, e.g., SPI, for further processing. The raw or initially processed sensor data is encapsulated into the data packet 420. The computing system may fetch the data packet 420 via a DMA system according to examples described herein, such as DMA system 100 or 200. The DMA system may receive the data packet 420 from a source memory (at the I/O interface).

The data packet 420 may deploy a vendor-defined protocol defining the structure of the data packet 420. The data packet 420 comprises, at its start, a command phase 421 comprising status data 422 of the sensor. The data packet 420 further comprises, subsequent to the command phase 421, a data phase 423 which is divided into N data frames, such as data frame 424-1 and 424-N. Each data frame comprises, at its start, a header 425 and, subsequent to the header, payload 426 (sensor data). The header 425 comprises synchronization data 427 (synchronization signals) and information data 428 (frame information). The header 425 may further comprise sensor configuration data, DMA configuration data, or alike.

The DMA system may determine whether the data frame 424-1 is a synchronized data frame based on the synchronization data 427, for instance. If the data frame 424-1 is deemed as synchronized data frame, the DMA system may extract the payload 426 from the data frame 424-1. The DMA system may, then, send the payload 426 or data derived from the payload 426 to a destination memory, e.g., for further processing such as FFT (Fast Fourier Transformation), CFAR (Constant False Alarm Rate) detection, or neural network detection/classification (in case the sensor is a radar sensor).

Figure 5A:
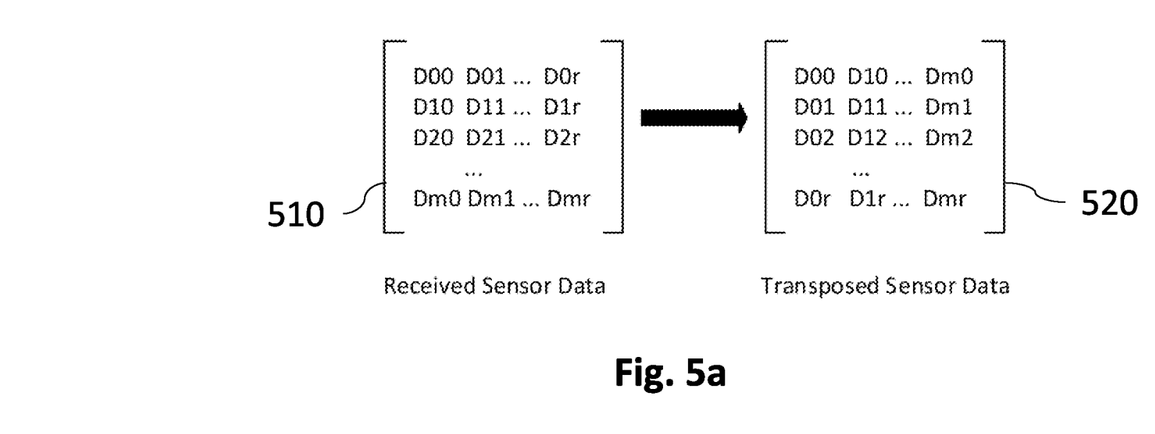
FIGS. 5*a* to 5*c* illustrate examples of data derived from a payload.
Figure 5B:
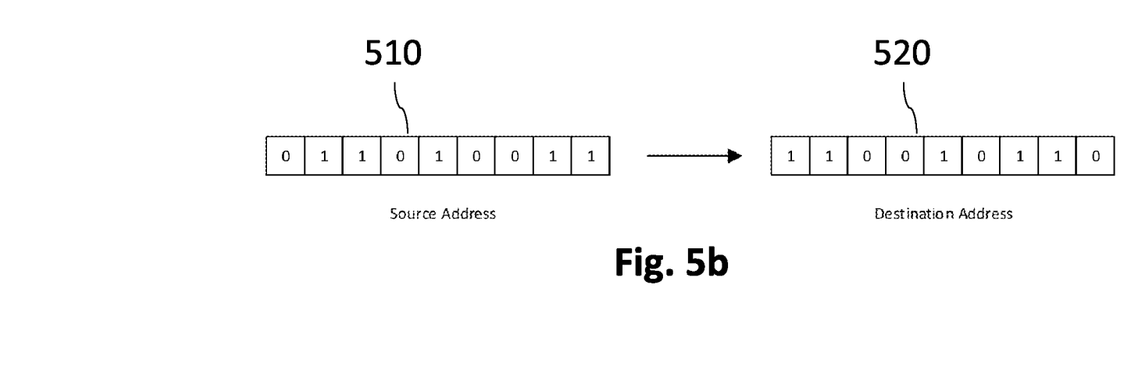
Figure 5C:
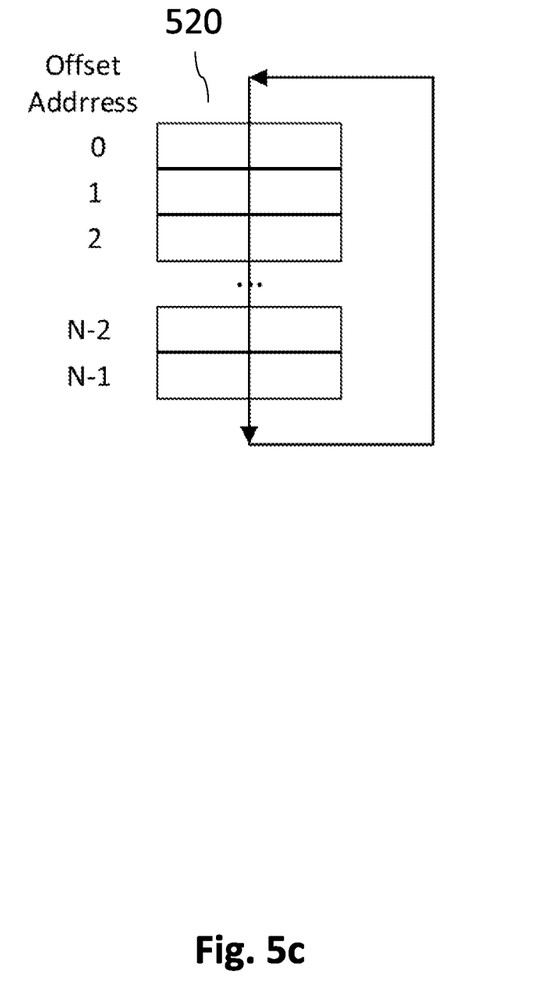

FIGS. 5a-5c illustrate examples of data 520 derived from payload 510. For instance, a DMA system according to examples described herein, such as DMA system 100 or 200, may be configured to extract the payload 510 from a data packet of a sensor. Depending on the application, the DMA system may restructure the payload 510, yielding the data 520 derived from the payload 510, to match requirements of further processing circuitry receiving the data 520 derived from the payload 510. Therefore, the DMA system may be configured to change the data structure of the payload 510, e.g., based on a matrix transposition (FIG. 5a), a bit-reversal permutation (FIG. 5b), or change the data structure of the payload 510 into a circular buffer structure (FIG. 5c). The DMA system may change the data structure of the payload 510, e.g., using a chained descriptor.

In FIG. 5a, the payload 510 in its initial data structure represents a matrix. The further processing circuitry may require the payload 510 to be reordered based on a matrix transposition, resulting in a transposed matrix. For example, if the payload 510 in its initial data structure is formatted as [chirps][tx][samples][rx], the DMA system may reorder the data elements of the payload 510 to obtain the format of [rx][chirps][tx][samples]. The DMA system may calculate a destination address according to the required matrix transposition and transfer the restructured data 520 (data derived from the payload) to a destination memory.

In FIG. 5b, data elements of the payload 510—in its initial data structure—are ordered according to a source address of each of the data elements, i.e., the payload 510 is a sequence of the data elements ordered by their respective source address. The further processing circuitry may require the payload 510 to be prepared for subsequent FFT algorithms. For example, a radar sensor may execute range FIFT on data generated by its antenna. The resulting FFT data, i.e., the payload 510, may be used by the further processing circuitry for Doppler FIFT processing. So, it may be useful to reshuffle the payload 510 before buffer fly-computation. Therefore, the DMA system may calculate a respective destination address for each of the data elements based on bit-reversal permutation.

In some examples, the DMA system may be configured to change the data structure of the payload 510 by cascading a matrix transposition and a bit-reversal permutation.

In FIG. 5c, the DMA system changes the (initial) data structure of the payload 510 (not shown in FIG. 5c) into a circular buffer structure. The DMA system may assign a respective destination address to each of the data elements of the payload 510 such that the data 520 derived from the payload 510 emulates an end-to-end connected, fixed-size buffer. This may especially advantageous if the payload 510 comprises audio data, e.g., from a silicon microphone, which initially exhibits a linear data structure. The audio data may be required to be sliced into short frames with overlapping parts between the frames. Therefore, the DMA system may prepare the audio data for slicing by sequentially writing data elements of the payload 510 into the destination memory from the start of the emulated circular buffer and wrap back to the start address when a predefined boundary of the circular buffer is reached. This may facilitate fetching the frames from the destination memory for the further processing circuitry.

Figure 6:
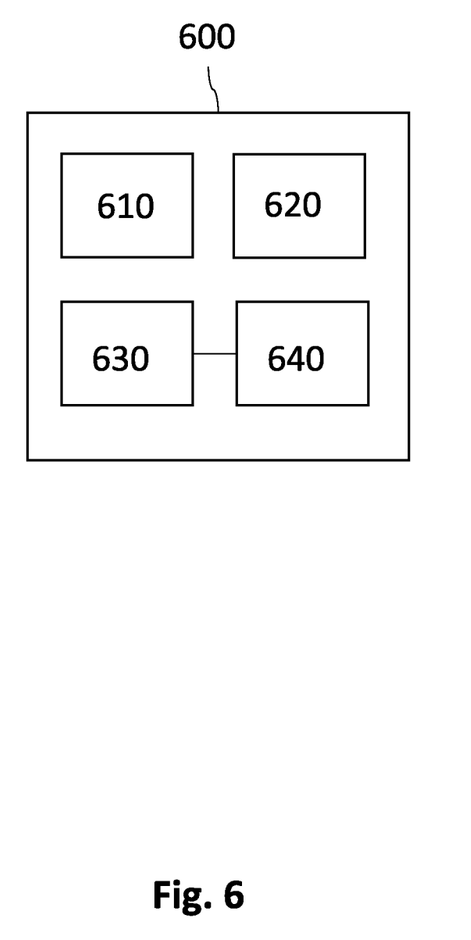
FIG. 6 illustrates a block diagram of an example of system for processing sensor data.

FIG. 6 illustrates an example of a system 600 for processing sensor data. The system 600 may be, e.g., a computing system. The system 600 comprises a DMA system 610 according to examples described herein, such as DMA system 100 or 200. The system 600 further comprises the source memory 620 from which the DMA system 610 may receive a data packet of a sensor. The source memory 620 may be an SPI receive buffer. In some examples, the system 600 comprises a sensor interface configured to receive the data packet from the sensor via a synchronous serial communication bus. The source memory 620 may be coupled to the sensor interface and configured to receive the data packet from the sensor interface.

The system 600 further comprises further processing circuitry 640 external to the DMA system 610. Processing circuitry of the DMA system 610 is configured to extract the payload from the data packet without involvement of the further processing circuitry 640. The further processing circuitry 640 may control an engine of the DMA system 610.

The system 600 further comprises the destination memory 630 to which the DMA system 610 sends a payload or data derived from the payload. The destination memory 630 may be an internal memory of the computing system. The further processing circuitry 640 is coupled to the destination memory 630, i.e., the further processing circuitry 640 may have access to the payload or the data derived from the payload. The further processing circuitry 640 is configured to read the payload or the data derived from the payload from the destination memory 630.

The further processing circuitry 640 is further configured to process the payload or the data derived from the payload, e.g., in order to perform a specific function matching an application of the system 600 such as gesture recognition or presence detection. In some examples, the payload comprises radar data, and the further processing circuitry 640 is configured to perform radar processing on the payload or the data derived from the payload. In cases, the DMA system 610 stores additional data such as information data, sensor configuration data, or DMA configuration data of the data packet in the destination memory 630, the further processing circuitry 640 may fetch the additional data and process it. For instance, the further processing circuitry 640 may retrieve a desired DMA configuration from the DMA configuration data. Then, the further processing circuitry 640 may configure the DMA system 610 according to the desired DMA configuration.

The DMA system 610 may, in some examples, process status data of the data packet and, if the status data indicates an error of the sensor, send an interrupt command to the further processing circuitry 640. The further processing circuitry 640 may prioritize processing the interrupt command over other processing activities of the further processing circuitry 640. The further processing circuitry 640 may process the interrupt command by, e.g., stopping a data transfer of the DMA system 610, resuming the data transfer, reconfiguring the DMA system 610, starting an error handling of the sensor, or alike.

In some examples, the data packet may comprise status data indicating a status of the sensor. The processing circuitry of the DMA system 610 may be configured to determine whether the status data indicate an error of the sensor. The output interface circuitry of the DMA system 610 may be configured to, if it is determined that the status data indicates an error of the sensor, send an interrupt command to the further processing circuitry 640. The further processing circuitry 640 may be configured to process the interrupt command, e.g., by stopping current processing of the further processing circuitry 640, saving a current state of the further processing circuitry 640, executing an interrupt handler, executing an interrupt service routine to solve an error of the sensor, stopping a current data transfer of the DMA system 610, reconfiguring the DMA system 610 and/or starting a new data transfer of the DMA system 610.

The system 600 may combine common DMA tasks of the DMA system 610 with a synchronization of data frames of the sensor data, a discard of misaligned data, and extraction of payload from aligned data, and/or a reorganization of a data structure of the payload without an involvement of the further processing circuitry 640. The system 600 may increase a maximum data transfer speed in a computing system combining the DMA system 610 and the further processing circuitry 640, thus, the system 600 may be useful for highspeed data acquisition. The system 600 may decrease latency in servicing a data acquisition device since the dedicated hardware of the DMA system 610 responds more quickly compared to an interrupt, and a time interval for transferring the data is shorter. Besides, the system 600 may reduce an amount of source memory 620 required for an I/O device.

Figure 7:
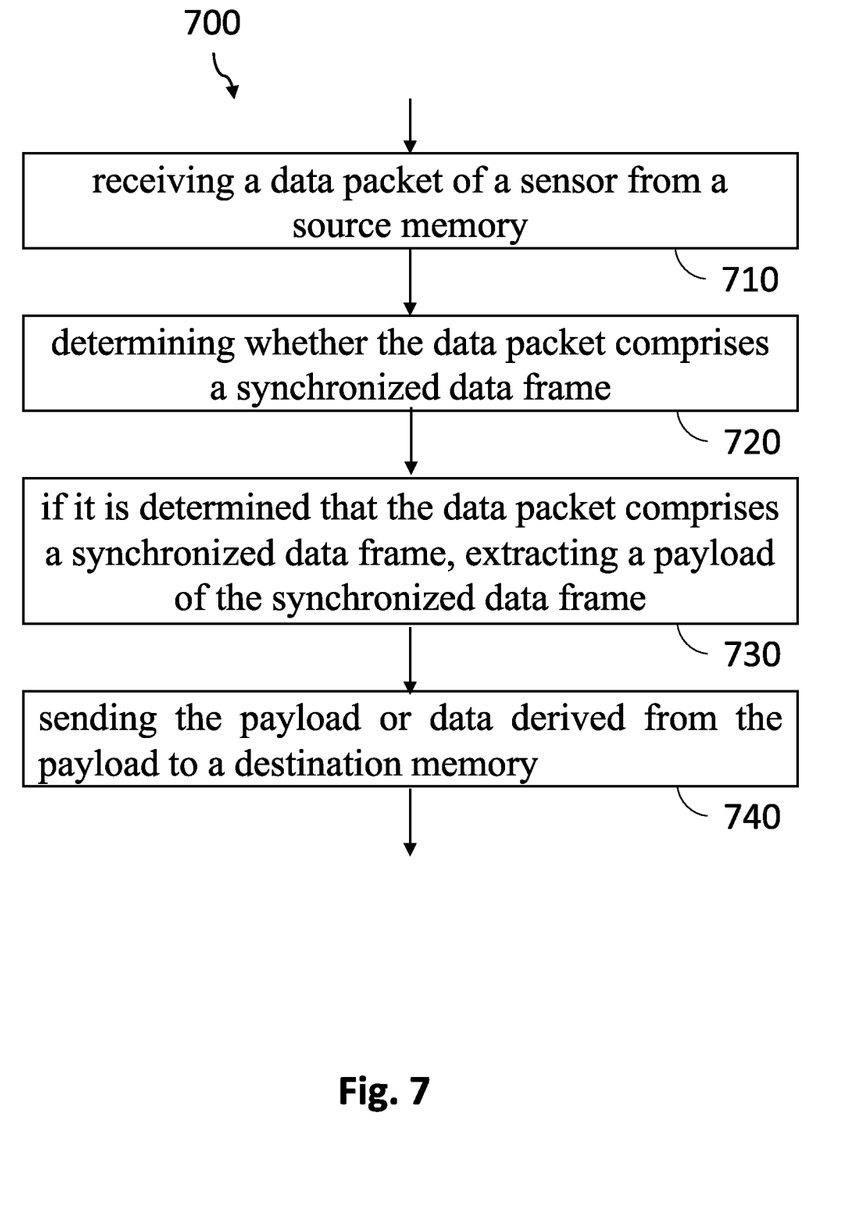
FIG. 7 illustrates a flowchart of an example of a method for DMA.

FIG. 7 illustrates a flowchart of an example of a method 700 for DMA. The method 700 comprises receiving 710 a data packet of a sensor from a source memory. The method 700 further comprises determining 720 whether the data packet comprises a synchronized data frame and, if it is determined that the data packet comprises a synchronized data frame, extracting 730 a payload of the synchronized data frame. The method 700 further comprises sending 740 the payload or data derived from the payload to a destination memory.

More details and aspects of the method 700 are explained in connection with the proposed technique or one or more examples described above, e.g., with reference to FIG. 1 and FIG. 2.

The method 700 may comprise one or more additional optional features corresponding to one or more aspects of the proposed technique, or one or more examples described above.

Methods, such as method 700, and apparatuses, such as DMA system 100 or system 600, disclosed herein may increase a maximum data transfer speed for sensor data processing. The methods and apparatuses may decrease latency in servicing a data acquisition device and reduce an amount of temporary storage required for a sensor interface.

The following examples pertain to further embodiments:

Embodiment (1) is a DMA system, comprising input interface circuitry configured to receive a data packet of a sensor from a source memory. The DMA system comprises processing circuitry configured to determine whether the data packet comprises a synchronized data frame and, if it is determined that the data packet comprises a synchronized data frame, extract a payload of the synchronized data frame. The DMA system comprises output interface circuitry configured to send the payload or data derived from the payload to a destination memory.

Embodiment (2) is the DMA system of embodiment (1), wherein the data packet comprises status data indicating a status of the sensor. The processing circuitry is further configured to determine whether the status data indicate an error of the sensor. The output interface circuitry is further configured to, if it is determined that the status data indicates an error of the sensor, send an interrupt command to a further processing circuitry external to of the DMA system.

Embodiment (3) is the DMA system of any one of the embodiments (1) or (2), wherein the processing circuitry is further configured to detect synchronization data in the data packet and determine whether the data packet comprises a synchronized data frame based on the synchronization data.

Embodiment (4) is the DMA system of embodiment (3), wherein the processing circuitry is further configured to extract the payload of the synchronized data frame based on a frame length of the synchronized data frame.

Embodiment (5) is the DMA system of embodiment (4), wherein the processing circuitry is further configured to determine the frame length based on at least one of the synchronization data and a header of the synchronized data frame.

Embodiment (6) is the DMA system of any one of the embodiments (1) to (5), wherein the processing circuitry is further configured to extract sensor configuration data from a header of the synchronized data frame. The sensor configuration data indicates a configuration of the sensor. The output interface circuitry is further configured to send the sensor configuration data to the destination memory.

Embodiment (7) is the DMA system of any one of the embodiments (1) to (6), wherein the data packet comprises DMA configuration data indicating a desired configuration of the DMA system. The processing circuitry is further configured to configure the DMA system based on the DMA configuration data.

Embodiment (8) is the DMA system of any one of the embodiments (1) to (7), wherein the processing circuitry is further configured to determine whether the data packet comprises invalid data and, if it is determined that the data packet comprises invalid data, discard the invalid data.

Embodiment (9) is the DMA system of embodiment (8), wherein the data packet comprises status data indicating a status of the sensor. The processing circuitry is configured to determine whether the data packet comprises invalid data by determining whether the data packet comprises data between the status data and the synchronized data frame and, if it is determined that the data packet comprises data between the status data and the synchronized data frame, discard the data between the status data and the synchronized data frame.

Embodiment (10) is the DMA system of embodiment (8) or (9), wherein the data packet comprises a second synchronized data frame following the synchronized data frame. The processing circuitry is configured to determine whether the data packet comprises invalid data by determining whether the data packet comprises data between the synchronized data frame and the second synchronized data frame and, if it is determined that the data packet comprises data between the synchronized data frame and the second synchronized data frame, discard the data between the synchronized data frame and the second synchronized data frame.

Embodiment (11) is the DMA system of any one of embodiments (8) to (10), wherein the processing circuitry is configured to determine whether the data packet comprises invalid data by determining whether the data packet comprises data preceding the synchronized data frame and, if it is determined that the data packet comprises data preceding the synchronized data frame, discard the data preceding the synchronized data frame.

Embodiment (12) is the DMA system of any one of embodiments (8) to (11), wherein the data packet comprises status data indicating a status of the sensor. The processing circuitry is further configured to determine whether the data packet comprises invalid data by determining whether the status data indicate an error of the sensor and, if it is determined that the status data indicates an error of the sensor, discard data of the data packet following the status data.

Embodiment (13) is the DMA system of any one of the embodiments (1) to (12), wherein the processing circuitry is further configured to change a data structure of the payload. The output interface circuitry is configured to send the payload with the changed data structure to the destination memory.

Embodiment (14) is the DMA system of embodiment (13), wherein the processing circuitry is configured to change the data structure of the payload based on a matrix transposition or a bit-reversal permutation.

Embodiment (15) is the DMA system of embodiment (13) wherein the processing circuitry is configured to change the data structure of the payload into a circular buffer structure.

Embodiment (16) is a system for processing sensor data. The system comprises a DMA system according to any one of embodiments (1) to (15), the source memory, the destination memory, and further processing circuitry external to the DMA system. The further processing circuitry is coupled to the destination memory and configured to read the payload or the data derived from the payload from the destination memory and process the payload or the data derived from the payload.

Embodiment (17) is the system of embodiment (16), wherein the processing circuitry of the DMA system is configured to extract the payload from the data packet without involvement of the further processing circuitry.

Embodiment (18) is the system of embodiment (16) or (17), further comprising a sensor interface configured to receive the data packet from the sensor via a synchronous serial communication bus. The source memory is coupled to the sensor interface and configured to receive the data packet from the sensor interface.

Embodiment (19) is the system of any one of embodiments (16) to (18), wherein the payload comprises radar data. The further processing circuitry is configured to perform radar processing on the payload or the data derived from the payload.

Embodiment (20) is the system of any one of embodiments (16) to (19), wherein, if the further processing circuitry receives an interrupt command from the DMA system, the further processing circuitry is configured to process the interrupt command.

Embodiment (21) is a method for DMA. The method comprises receiving a data packet of a sensor from a source memory, determining whether the data packet comprises a synchronized data frame, and, if it is determined that the data packet comprises a synchronized data frame, extracting a payload of the synchronized data frame. The method further comprises sending the payload or data derived from the payload to a destination memory.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A direct memory access (DMA) system, comprising:
input interface circuitry configured to be coupled to a source memory, and configured to read a data packet of a sensor from the source memory, wherein the source memory is configured to receive the data packet from the sensor;
processing circuitry coupled to the input interface circuitry, the processing circuitry configured to:
receive the data packet from the input interface circuitry,
determine whether the data packet comprises a synchronized data frame, and
extract a payload of the synchronized data frame in response to a determination that the data packet comprises the synchronized data frame, wherein the payload comprises radar data, and extracting the payload includes extracting a detection bit from a header of the synchronized data frame, and the detection bit indicates detection of an object by the sensor; and
output interface circuitry coupled to the processing circuitry, the output interface circuitry configured to write the extracted payload or data derived from the extracted payload to a destination memory.

2. The DMA system of claim 1, wherein:
the data packet comprises status data indicating a status of the sensor;
the processing circuitry is further configured to determine whether the status data indicate an error of the sensor; and
the output interface circuitry is further configured to send an interrupt command to further processing circuitry external to the DMA system in response to a determination that the status data indicates the error of the sensor.

3. The DMA system of claim 1, wherein the processing circuitry is further configured to:
detect synchronization data in the data packet; and
determine whether the data packet comprises the synchronized data frame based on the synchronization data.

4. The DMA system of claim 3, wherein the processing circuitry is further configured to extract the payload of the synchronized data frame based on a frame length of the synchronized data frame.

5. The DMA system of claim 4, wherein the processing circuitry is further configured to determine the frame length based on at least one of the synchronization data or the header of the synchronized data frame.

6. The DMA system of claim 1, wherein:
the processing circuitry is further configured to extract sensor configuration data from the header of the synchronized data frame;
the sensor configuration data indicates a configuration of the sensor; and
the output interface circuitry is further configured to write the sensor configuration data to the destination memory.

7. The DMA system of claim 1, wherein:
the data packet comprises DMA configuration data indicating a desired configuration of the DMA system; and
the processing circuitry is further configured to configure the DMA system based on the DMA configuration data.

8. The DMA system of claim 7, wherein the desired configuration comprises a DMA transfer mode or a network address of the source memory.

9. The DMA system of claim 8, wherein the DMA transfer mode comprises a single mode, a block mode, or a demand mode.

10. The DMA system of claim 1, wherein the processing circuitry is further configured to:
determine whether the data packet comprises invalid data; and
discard the invalid data in response to a determination that the data packet comprises invalid data.

11. The DMA system of claim 10, wherein:
the data packet comprises status data indicating a status of the sensor; and
the processing circuitry is configured to:
determine whether the data packet comprises invalid data by determining whether the data packet comprises data between the status data and the synchronized data frame, and
discard the data between the status data and the synchronized data frame in response to a determination that the data packet comprises data between the status data and the synchronized data frame.

12. The DMA system of claim 10, wherein:
the data packet comprises a second synchronized data frame following the synchronized data frame; and
wherein the processing circuitry is further configured to:
determine whether the data packet comprises invalid data by determining whether the data packet comprises data between the synchronized data frame and the second synchronized data frame, and
discard the data between the synchronized data frame and the second synchronized data frame in response to a determination that the data packet comprises data between the synchronized data frame and the second synchronized data frame.

13. The DMA system of claim 10, wherein the processing circuitry is configured to:
  determine whether the data packet comprises invalid data by determining whether the data packet comprises data preceding the synchronized data frame; and
  discard the data preceding the synchronized data frame in response to a determination that the data packet comprises data preceding the synchronized data frame.

14. The DMA system of claim 10, wherein:
  the data packet comprises status data indicating a status of the sensor; and
  the processing circuitry is further configured to:
    determine whether the data packet comprises invalid data by determining whether the status data indicate an error of the sensor, and
    discard data of the data packet following the status data in response to a determination that the status data indicates the error of the sensor.

15. A system comprising:
  The DMA system of claim 1; and
  further processing circuitry external to the DMA system, wherein the further processing circuitry is configured to perform radar processing on the extracted payload or the data derived from the extracted payload.

16. A system for processing sensor data, comprising:
  a source memory configured to receive sensor data from a sensor;
  a destination memory;
  a direct memory access (DMA) system, comprising:
    input interface circuitry coupled to the source memory, the input interface circuit configured to read a data packet of the sensor from the source memory;
    processing circuitry coupled to the input interface circuitry, the processing circuitry configured to:
      receive the data packet from the input interface circuitry,
      determine whether the data packet comprises a synchronized data frame, and
      extract a payload of the synchronized data frame in response to a determination that the data packet comprises the synchronized data frame, wherein the payload comprises radar data, extracting the payload includes extracting a detection bit from a header of the synchronized data frame, and the detection bit indicates detection of an object by the sensor; and
    output interface circuitry coupled to the processing circuitry, the output interface circuitry configured to write the extracted payload or data derived from the extracted payload to the destination memory; and
  further processing circuitry external to the DMA system and coupled to the destination memory, the further processing circuitry configured to:
    read the extracted payload or the data derived from the extracted payload from the destination memory, and
    process the extracted payload or the data derived from the extracted payload by performing radar processing on the extracted payload or the data derived from the extracted payload.

17. The system of claim 16, wherein the processing circuitry of the DMA system is configured to extract the payload from the data packet without involvement of the further processing circuitry.

18. The system of claim 16, further comprising a sensor interface configured to receive the data packet from the sensor via a synchronous serial communication bus, wherein the source memory is coupled to the sensor interface and configured to receive the data packet from the sensor interface.

19. A method, comprising:
  receiving, by a source memory, a data packet of a sensor;
  reading, by a direct memory access (DMA) system, the data packet from the source memory;
  determining, by the DMA system, whether the data packet comprises a synchronized data frame;
  extracting, by the DMA system, a payload of the synchronized data frame in response to a determination that the data packet comprises the synchronized data frame, wherein the payload comprises radar data, extracting the payload includes extracting a detection bit from a header of the synchronized data frame, and the detection bit indicates detection of an object by the sensor;
  writing, by the DMA system, the extracted payload or data derived from the extracted payload to a destination memory; and
  performing, by a processor external to the DMA system, radar processing on the extracted payload.

20. The method of claim 19, wherein:
  the data packet comprises status data indicating a status of the sensor; and
  the method further comprises:
    determining whether the status data indicate an error of the sensor; and
    sending an interrupt command to further processing circuitry external to the DMA system in response to a determination that the status data indicates the error of the sensor.

21. The method of claim 19, further comprising:
  detecting synchronization data in the data packet; and
  determining whether the data packet comprises the synchronized data frame based on the synchronization data.

22. The method of claim 21, further comprising extracting the payload of the synchronized data frame based on a frame length of the synchronized data frame.

* * * * *